United States Patent [19]

Midwinter et al.

[11] 4,101,305

[45] Jul. 18, 1978

[54] DRAWING DIELECTRIC OPTICAL WAVEGUIDES

[75] Inventors: John Edwin Midwinter, Suffolk; Clive Richard Day, London, both of England

[73] Assignee: The Post Office, London, England

[21] Appl. No.: 800,429

[22] Filed: May 25, 1977

Related U.S. Application Data

[62] Division of Ser. No. 591,958, Jun. 30, 1975, Pat. No. 4,040,807.

[30] Foreign Application Priority Data

Jul. 10, 1974 [GB] United Kingdom ............... 30525/74

[51] Int. Cl.² ........................... C03B 5/32; C03B 5/20
[52] U.S. Cl. ........................................ 65/145; 65/57; 65/335
[58] Field of Search ................... 65/335, 121, 157, 32, 65/145

[56] References Cited

U.S. PATENT DOCUMENTS

| | | | |
|---|---|---|---|
| 2,900,708 | 8/1959 | Pond | 65/121 X |
| 3,209,641 | 10/1965 | Upton | 65/121 X |
| 3,288,583 | 11/1966 | Sheldon | 65/121 X |
| 3,717,450 | 2/1973 | Loughridge | 65/157 X |
| 3,890,127 | 6/1975 | Siegmund | 65/157 X |
| 4,023,953 | 5/1977 | Megles, Jr. et al. | 65/121 X |
| 4,023,953 | 5/1977 | Megles, Jr. et al. | 65/145 X |
| 4,032,313 | 6/1977 | Tokuhara | 65/121 X |
| 4,039,607 | 8/1977 | Miller | 65/DIG. 7 |

*Primary Examiner*—S. Leon Bashore
*Assistant Examiner*—Frank W. Miga
*Attorney, Agent, or Firm*—Kemon & Estabrook

[57] ABSTRACT

An apparatus for drawing a dielectric optical waveguide having minimal attenuation characteristics comprises a double crucible in a closed atmosphere container with glass rod supply means and atmosphere supply means.

6 Claims, 5 Drawing Figures

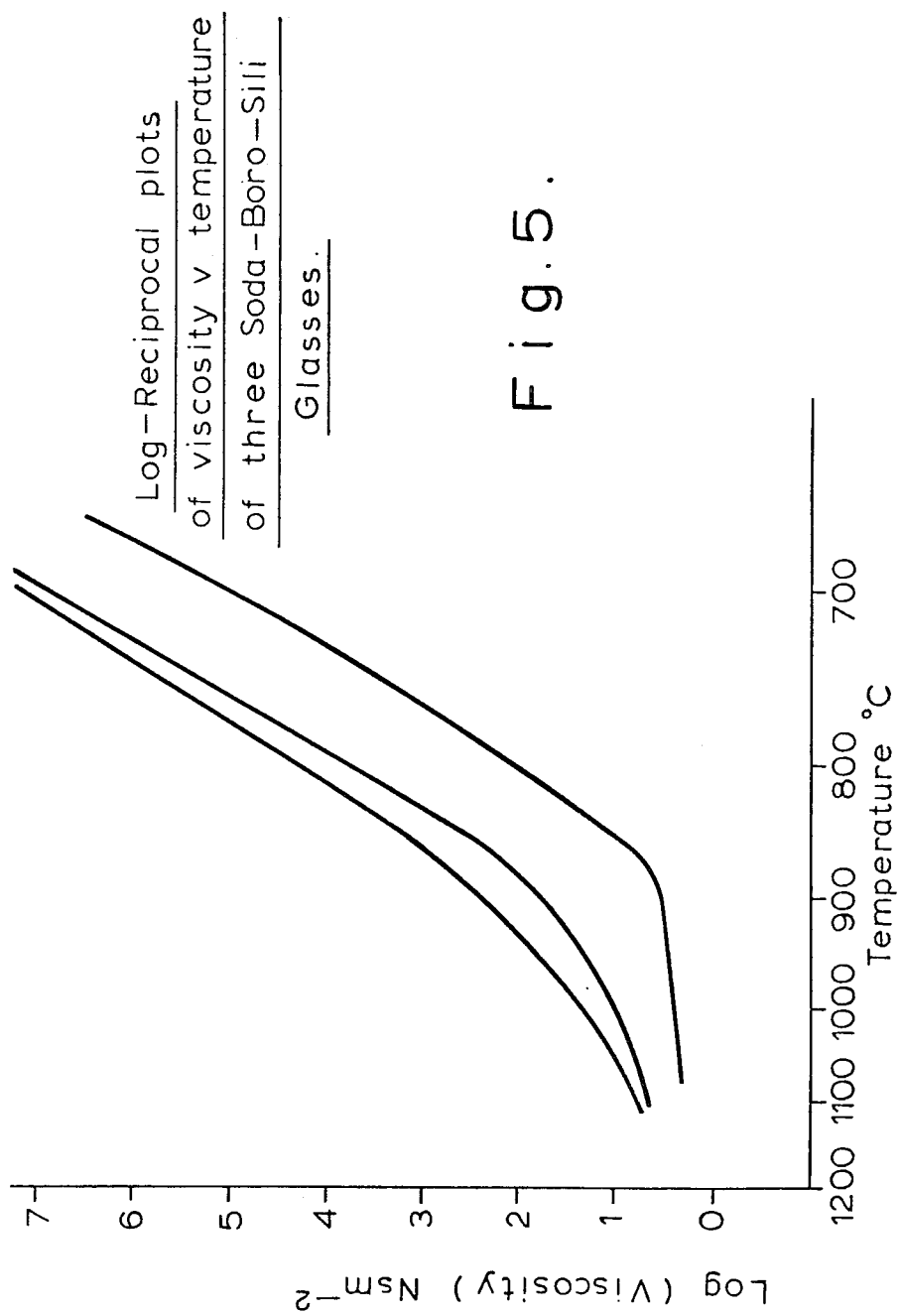
Fig. 5. Log-Reciprocal plots of viscosity v temperature of three Soda-Boro-Sili Glasses.

DRAWING DIELECTRIC OPTICAL WAVEGUIDES

This is a division, of application Ser. No. 591,958, filed June 30, 1975, now U.S. Pat. No. 4,040,807 issued Aug. 9, 1977.

The present invention relates to methods of operating a double crucible for drawing dielectric optical waveguides, and apparatus incorporating a double crucible.

One method of making dielectric optical waveguides consists of drawing a clad fibre from a double crucible. The double crucible consists of an outer crucible with a drawing orifice containing an inner crucible again with a drawing orifice. The two crucibles are filled with the two glasses to be used for the core and cladding of the dielectric optical waveguide respectively and the dielectric optical waveguide can then be drawn from the crucible in a conventional manner. One of the principal problems with the use of double crucibles for making dielectric optical waveguides is preventing the formation of gas bubbles in the glass. The presence of gas bubbles in the drawn dielectric optical waveguide results in considerable increase in attenuation of the waveguide. Gas giving rise to bubbles may be trapped in the glass melted in the double crucible, or it may be evolved during the drawing process as a result of electrolytic action set up in the drawing nozzles of the double crucibles.

It has been found that by surrounding the double crucible with an inert non-oxidizing gas, electrolytic bubble formation is to a large extent eliminated and dielectric optical waveguides with greatly enhanced transmission properties can be obtained. A typical gas suitable for this is carbon dioxide. Trapped gas can be reduced by initially loading the crucible under vacuum and melting the glass under vacuum. This process results in liberation of a large number of gas bubbles because of the reduced pressure. However it has been found that gas so liberated dissolves more readily in the glass when atmospheric pressure is restored, than trapped gas.

It is also possible to reduce trapped gas by feeding the double crucibles with glass rod at a slow rate, when this is done it is believed that the meniscus formed between the glass rod and the glass surface is a positive meniscus. If the glass rod is guided so that the glass rod always enters the glass surface at the same point rather than spiralling in as is usually the case the amount of gas trapped is again reduced.

According to a first aspect of the present invention there is provided a method of drawing dielectric optical waveguide from a double crucible wherein electrolytic bubble formation is inhibited by surrounding the double crucible with a non-oxidising atmosphere.

According to a second aspect of the present invention there is provided a method of loading glass into a heated double crucible for drawing dielectric optical waveguide comprising feeding a glass rod into a glass melt in the double crucible at a slow rate so that gas is not pulled into the glass melt where the glass rod enters the glass melt.

According to a third aspect of the present invention there is provided a method of loading glass into a heated double crucible for drawing dielectric optical waveguides comprising slowly feeding a glass rod into a glass melt in the double crucible, and guiding the glass rod so that an axis of the glass rod intercepts a surface of the glass melt at a point substantially stationary with respect to motion transverse to the surface of the glass melt.

According to a fourth aspect of the present invention there is provided apparatus for drawing dielectric optical waveguides comprising a double crucible enclosed in a container, means for hermetically sealing the said container, heating means for heating said double crucible, guide means for inhibiting the lateral movement of glass rods to be loaded into said double crucible, and a gas inlet into said container.

Embodiments of the invention will now be described by way of example with reference to the accompanying drawings in which:

FIG. 5 shows the typical relationship between viscosity and temperature for soda-boro- silicate glasses;

Figure 1:
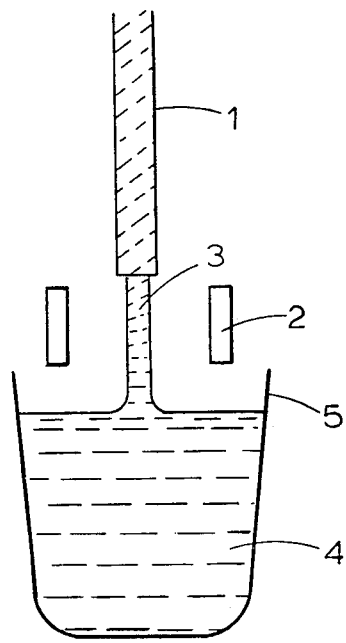
FIG. 1 illustrates the preparation of glass rods for use in loading a double crucible.

One of the principal problems associated with the manufacture of dielectric optical waveguides using a double crucible is preventing the formation of bubbles in the melt. In order to do this considerable care is required in loading the glass into the double crucible during the drawing operation. In addition it is necessary to prevent the electrolytic formation of gas bubbles. Initially both compartments of the double crucible can be loaded by packing the compartments with short lengths of glass rod from which the core and cladding are to be made. Obviously the cladding glass goes into the outer compartment and the core glass goes into the inner compartment. These glass rods are prepared by drawing them upwards from the melt. This process is illustrated in FIG. 1.

After the molten glass 4. has been fined for about twenty-four hours in crucible 5, it is removed from the glass melting furnace and its temperature is allowed to fall to around 800° C, (for a typical soda-boro-silicate glass) at which temperature the viscosity is between $10^3$ and $10^4$ poise. A water jacket 2. is placed over the melt at a distance of at least 1 cm from the melt.

A glass or silica rod is lowered into the melt and then raised at a controlled speed, thus pulling a rod 3 of the melt glass. The water jacket ensures that the glass rod that has been pulled solidifies reasonably rapidly. Typical pulling rates vary from 2 meters per hour for thick rods to 1 meter per minute for thin rods. Obviously the diameter of the pulled rod is a function both of the pulling rate and the viscosity of the molten glass. Glass rods prepared in this way are sometimes referred to as cane.

After the cane has been prepared in the manner described above, it is stored in lengths in silica tubes with dry nitrogen flowing through the tubes. The dry nitrogen is filtered and a flow rate of about 100 cc per minute is used. This keeps the surface of the cane dry thus helping to prevent water getting into the final dielectric optical waveguides and prevents contamination of the cane by other impurities such as transition metals etc.

One cause of bubble formation in drawn dielectric optical waveguide is an electrolytic reaction which occurs in the vicinity of the drawing nozzles of the double crucible. This effect can be eliminated by excluding oxygen from the atmosphere surrounding the double crucible. This may be done by surrounding the double crucible with an atmosphere of carbon dioxide, or some other inert gas such as nitrogen or argon, in addition an oxygen scavenging gas such as carbon monoxide may be employed. Details of flow rates etc., for this process will be discussed later in this specification.

If glass is to be added to the double crucible during a fibre drawing run it is necessary to ensure that gas bubbles are not formed in the glass during the loading process. This may be done by preventing the entrapment of gas. It is possible to substantially reduce the entrapment of gas by slowly feeding glass rods into the melt. Typically for a rod having a diameter between 3 and 10 mm, usually 6 to 8 mm, a feed rate of 15 to 30 mm of rod per minute is always used. At this feed speed it is believed that the meniscus formed between the molten glass surface and the rod is always positive, i.e. the glass surface rises up to meeting the edges of the rod. If substantially faster speeds are used a negative meniscus may be formed, i.e. the rod depresses the surface of the melt, and gas bubbles are entrapped at the point at which the glass surface meets the wall of the rod. At these slow feed speeds the glass rod is substantially molten by the time it enters the melt surface. Because of this if no precautions are taken the glass rod will tend to form a helical spiral as it enters the glass surface, and fold over on itself; this process will also result in entrapment of gas. This helical motion can be prevented by providing guides which hold the glass rod substantially at 90° to the melt surface. These guides are of course located well clear of the molten glass surface.

Finally one method thay may be used to cut down the amount of gas bubbles formed in the glass during the initial loading of the double crucible involves melting the glass under vacuum. The double crucible is placed in a vacuum and the glass rods in the double crucible slowly heated to allow drying and out-gassing of the glass surfaces, the glass rods are then allowed to melt. Melting the glass under vacuum results in the liberation of a large number of gas bubbles. However on returning the glass while still in the molten state to atmospheric pressure these gas bubbles rapidly disolve. This results in the formation of a substantially bubble-free melt.

An apparatus containing a double crucible in which the methods discussed above can be realized is illustrated in FIG. 2. A double crucible having an inner compartment 6 and an outer compartment 7 is placed in a vertical cylindrical furnace having a furnace wall of silica 9. The double crucible is supported on a silica cylinder 13 which rests on a base plate 15. On the silica cylinder 13 are positioned six silica plates 10 each having a central hole. The central hole decreases in diameter toward the top of the stack of plates. In the second plate from the top a slot is cut into which is positioned a thermocouple 11 for monitoring the temperature at the drawing nozzle 8 of the double crucible. On top of the stack of plates 10 is positioned a second silica cylinder 12 and the double crucible is suppored directly by this cylinder. A lip of the double crucible overlaps the top of cylinder 12. The stack of plates 11 acts as a thermal baffle to prevent radiation of heat in a downward direction. This helps to prevent remelt of the drawn dielectric optical waveguide. This base plate 15 is attached to the furnace wall 9 by means of an O-ring 14 which is compressed between base plate 15 and an annular plate 16 by means of bolts 18. The base plate 15 and annular plate 16 are water cooled by means of pipes 17. A top plate 20 is held onto the furnace wall 9 by means of O-ring 19 which is squeezed between the top plate 20 and an annular plate 21 by means of bolt 23. Again the top plate 20 and annular plate 21 are water cooled by means of pipes 22. A gas inlet pipe 24 passes through the top plate 20. In addition two guides 26 are provided in the top plate for guiding can when loading the double crucible. These guides are sealed by cone joints and sealing plugs 25. Alternatively the loading assemblies which will be described later may be attached. The double crucible itself is preferably made of platinum but silica may be used. The base plate 15 is provided with a central hole 32 through which the dielectric optical waveguide passes when drawing is in progress. This hole may be sealed by means of a jug 30 having an O-ring seal 31. A jug is used so that any glass dripping from the double crucible is caught within the jug and does not build up in the hole 32. The furnace is heated by means of windings 27 formed from 90% platinum 10% rhodium and surrounding the cylindrical furnace wall 9.

Figure 4:
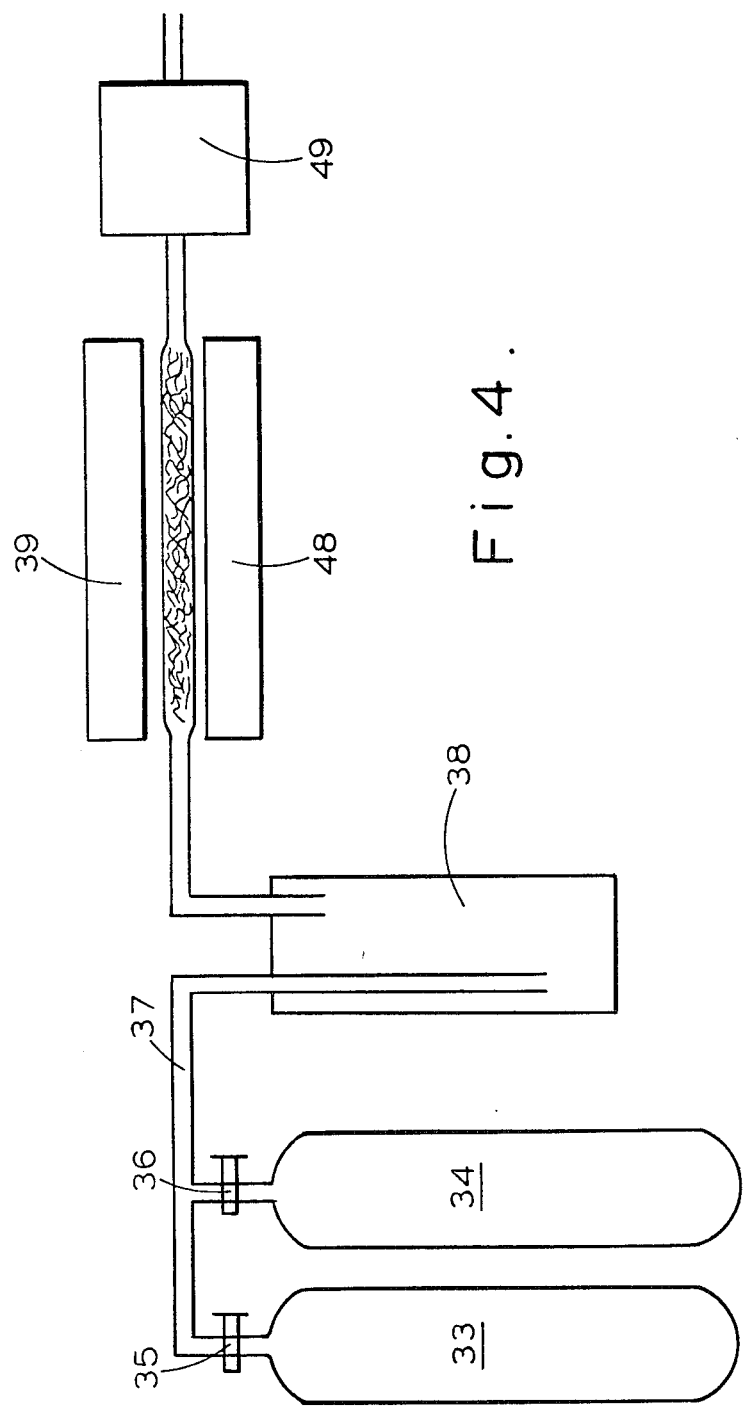
FIG. 4 shows apparatus for drying gas for use in conjunction with the apparatus of FIG. 3.

As previously mentioned electrolytic bubble formation at the nozzle 8 of the double crucible is prevented by surrounding the double crucible with an atmosphere of carbon dioxide and carbon monoxide. The gas is fed into the double crucible via pipe 24 which is connected to the gas supply line shown in FIG. 4. Carbon dioxide is supplied from cylinder 33 via valve 35 and a flow meter (not shown) to line 37, and carbon monoxide is supplied from cylinder 34 via valve 36 and a flow meter (not shown) to line 37. The two gasses are mixed in line 37 and then pass through a molecular sieve 38. The gas then passes through a tube 48 filled with silica wool. This tube is heated in a furnace 39 to a temperature of around 300° C. The gas then passes out through a filter having a pore size of 0.25 microns and thence to the inlet tube 24 of the apparatus shown in FIG. 2. The molecular sieve is, prior to use, heated with a reversed flow of dry nitrogen passing through it. The gas after passing through the molecular sieve has a water content corresponding to a dew point of around $-60°$ C. The purpose of the heated tube 48 is to remove carbonyls which may be present in the carbon-monoxide. These carbonyls are formed by the interaction between carbon monoxide and transition metals such as nickel under pressure.

Figure 2:
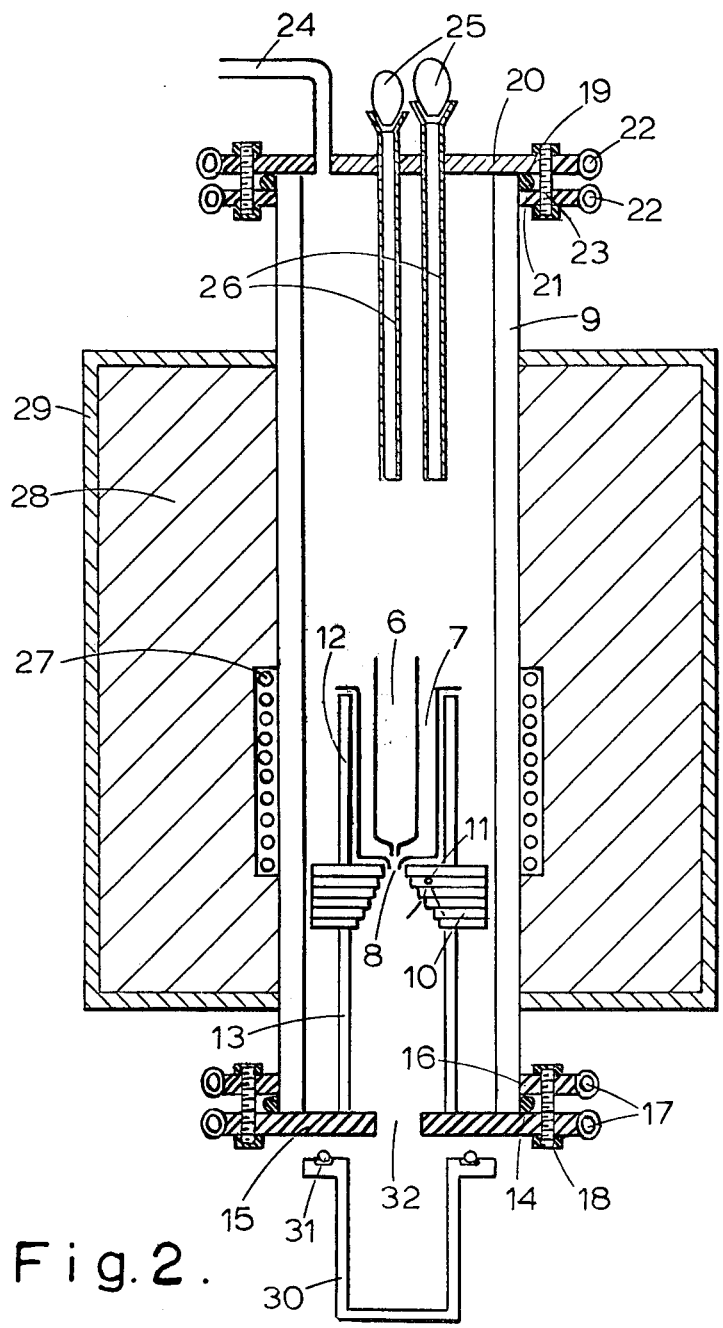
FIG. 2 shows a section through apparatus employing a double crucible for drawing dielectric optical waveguides according to the invention.

When the apparatus shown in FIG. 2 is in use it is important that both the top and bottom of the device should not be open to atmosphere at the same time. If this is done the inert atmosphere inside furnace tube 9 is very rapidly removed by a chimney action. Typically if stoppers 25 are in position and the bottom is open, i.e. jug 30 is removed, then a flow rate of carbon-dioxide of 1600 ml per minute gives an atmosphere containing 150 parts per million of oxygen, while a flow rate of 500 ml of carbon-dioxide per minute gives an atmosphere in furnace tube 9 containing 1500 parts per million of oxygen. If 5% carbon-monoxide is added to a flow of 500 mm per minute of carbon-dioxide then an oxygen partial pressure inside furnace tube 9 of $10^{-9}$ atmospheres of oxygen is obtained. If under these conditions i.e. 5% carbon monoxide in carbon-dioxide at a flow rate of 500 ml per minute, with the bottom open, the loading hole at the top is half opened, i.e. one of stoppers 25 is removed then the atmosphere inside the furnace tube 9 contains 18.5% oxygen closing the top causes the oxygen content again to drop to a partial pressure of $10^{-9}$ atmospheres. From these figures it should be realised that it is essential that top and bottom of the furnace 9 should not be opened simultaneously.

With top and bottom both closed and using a carbon-dioxide flow rate of 1600 ml/minute and carbon monoxide flow rate of about 50 ml/minute, the partial oxygen pressure is about $10^{-15}$ atmospheres.

During loading of the double crucible the top is open, and the bottom therefore maintained shut. During this phase of the operation the gas flow rate is 2 liters per minute of carbon-dioxide plus 50 ml per minute of carbon-monoxide.

When fibre is being drawn from the double crucible the top of the apparatus shown in FIG. 2 is sealed and the jug 30 is removed. Under these conditions a flow rate of 500 ml per minute of carbon-monoxide containing 5% carbon-monoxide is employed.

Using the apparatus described a typical pull rate for dielectric optical waveguide is 0.1 to 0.2 meters per second, however, the pulling rate may vary between 0.05 to 7 meters per second. Glass viscosities are typically for the cladding glass $10^3$ to $10^5$ poise, and for the core glass $10^2$ to $10^5$ poise. Typical viscosities for soda-boro-silicate glasses are shown in FIG. 5 as a function of temperature for three glasses. From this it can be seen that typical operating temperatures for the double crucible may be in the range of 800° C to 900° C.

After the glass has been loaded into the double crucible and melted, a fibre drawing run can be started by allowing a gob of glass to form and detach itself naturally under gravity, the gob being drawn out and attached fo a drum which is rotating at a suitable speed to give the desired drawing rate. Alternatively a silica probe may be inserted into the mouth of the double crucible and pulled down bringing with it a filament of molten glass which is again attached to a rotating drum.

Following use of the equipment, it is necessary for the double crucible to be thoroughly cleaned before it is used with a different set of glasses. This cleaning process consists of the following stages:

1. The double crucible is maintained at temperature in the apparatus shown in FIG. 9 and the glass is allowed to drip out of the crucible.
2. The crucible is then removed from the apparatus shown in FIG. 2, inverted and placed into a heated furnace so that more glass can drain out of the crucible.
3. The remaining glass is removed by etching the double crucible with a boiling mixture of approximately 45 sulphuric acid and 20% hydrofluric acid.
4. All silica ware is cleaned by etching in dilute hydrofluoric acid.
5. All equipment which needs to be handled by laboratory personnel is handled using gloves.
6. The final stage of all cleaning processes consists of washing in deionised water and drying in an oven.

Figure 3:
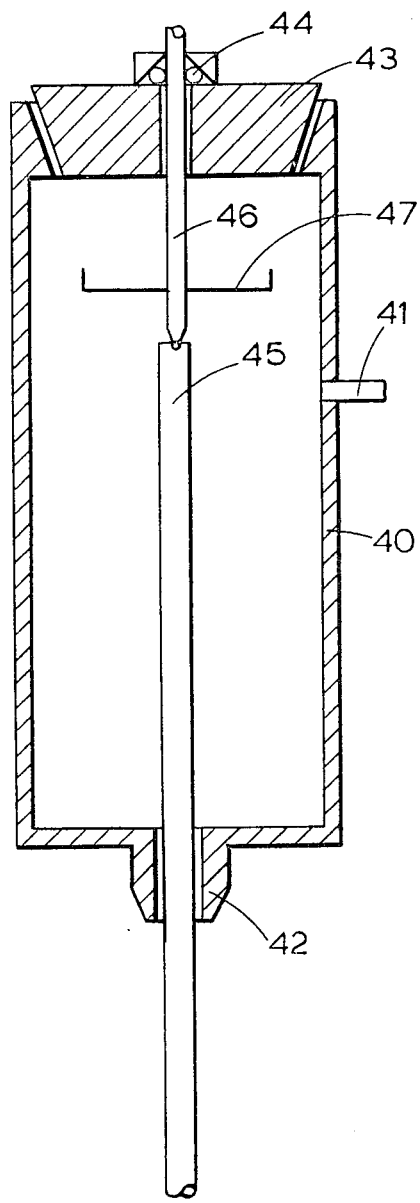
FIG. 3 shows a loading assembly for semicontinuous loading of a double crucible according to the invention.

In order that rod can be continually fed to the double crucible either under vacuum conditions, or in a inert gas atmosphere, the loading assembly illustrated in FIG. 3 can be used. This device consists of a long cylindrical tube 40 having an inlet pipe 41 which can be used either to supply gas or to evacuate the chamber. The lower end of the cylinder is provided with a cane joint 42 which can be fitted onto cane joints 25. The upper end of the cylinder is provided with a sealable lid 43, which has a sliding O-ring gland 44. The glass rod 45 to be fed into the double crucible is attached to a rod 46 which passes through the gland 44. A plate 47 is provided to catch any contamination which might fall from gland 44.

Rod 46 is, in use, driven downwards at a suitably controlled speed so that rod 45 is fed into the double crucible at the required rate. This operation may be carried out while the fibre is drawn so that a fully continuous drawing process is possible.

What we claim is:

1. Apparatus for drawing dielectric optical waveguides comprising:
    a container;
    a double crucible assembly within said container, having inner and outer compartments;
    means for hermetically sealing said container;
    means for heating said double crucible;
    guide means comprising a pair of tubes extending vertically into said container for inhibiting lateral movement of glass rods to be loaded into the compartments of said double crucible, thereby insuring that rods are substantially at 90° to the melt surface in said compartments; and
    means defining a gas inlet into said container.

2. Apparatus as claimed in claim 1 wherein said double crucible has a support means within said container including a thermal baffle for inhibiting the downward transmission of heat.

3. Apparatus as claimed in claim 1 including a sealed airlock attached to said container so that said glass rods may be loaded into said double crucible without exposing said double crucible to the ambient atmosphere.

4. Apparatus as claimed in claim 3 wherein said airlock is provided with a gland and drive rod passing through said gland, for feeding glass rods into said double crucible at a controlled rate.

5. Apparatus as defined by claim 1 wherein said container is a cylindrical tube and said means for hermetically sealing includes water cooled top and bottom plates and O-rings secured to opposite ends of said tube.

6. Apparatus as defined by claim 1 including a source of a mixture of carbon monoxide and carbon dioxide, means including a molecular sieve and a tube filled with silica connecting said source to said gas inlet and means for heating said tube.

* * * * *